US007744120B2

(12) United States Patent
Rust et al.

(10) Patent No.: US 7,744,120 B2
(45) Date of Patent: Jun. 29, 2010

(54) INTEGRATED OVERHEAD SIDE AIRBAG MODULE

(75) Inventors: John C Rust, Rochester Hills, MI (US); Joseph G Lemmon, Chesterfield, MI (US); Michael A Warnez, Ortonville, MI (US); Shawn R Williams, Auburn Hills, MI (US); Babak R Famili, Troy, MI (US); Robert P Kuhr, Farmington Hills, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 1016 days.

(21) Appl. No.: 11/325,770

(22) Filed: Jan. 5, 2006

(65) Prior Publication Data

US 2007/0152431 A1 Jul. 5, 2007

(51) Int. Cl.
*B60R 21/213* (2006.01)
*B60R 21/215* (2006.01)
(52) U.S. Cl. ............... 280/730.2; 280/728.2; 280/728.3
(58) Field of Classification Search .............. 280/728.2, 280/728.3, 730.2
See application file for complete search history.

(56) References Cited

U.S. PATENT DOCUMENTS

| 6,073,961 | A  | * | 6/2000 | Bailey et al. ............. 280/730.2 |
| 6,079,732 | A  | * | 6/2000 | Nakajima et al. ........ 280/728.2 |
| 6,142,506 | A  | * | 11/2000 | Patel et al. ............... 280/728.2 |
| 6,224,087 | B1 | * | 5/2001 | Stutz et al. ............... 280/728.2 |
| 6,234,515 | B1 | * | 5/2001 | Iwanaga .................. 280/728.2 |
| 6,257,616 | B1 | * | 7/2001 | Nowak et al. ............ 280/730.2 |
| 6,293,581 | B1 | * | 9/2001 | Saita et al. ............... 280/730.2 |
| 6,296,269 | B1 | * | 10/2001 | Nagai et al. .............. 280/728.2 |
| 6,364,349 | B1 | * | 4/2002 | Kutchey et al. .......... 280/730.2 |
| 6,523,887 | B1 | * | 2/2003 | Picken et al. ................ 296/214 |
| RE38,125  | E  | * | 5/2003 | Shibata et al. ........... 280/730.2 |
| 6,592,143 | B2 | * | 7/2003 | Takahashi et al. ........ 280/730.2 |
| 6,705,636 | B2 | * | 3/2004 | Takahara ................. 280/728.2 |
| 7,017,942 | B2 | * | 3/2006 | Elqadah et al. .......... 280/730.2 |
| 2001/0000290 | A1 | * | 4/2001 | Nakajima et al. ........ 280/730.2 |
| 2001/0022441 | A1 | * | 9/2001 | Nakajima et al. ........ 280/730.2 |
| 2002/0024202 | A1 | * | 2/2002 | Kubota et al. ............ 280/730.2 |
| 2002/0190507 | A1 | * | 12/2002 | Sante et al. .............. 280/730.2 |
| 2003/0205887 | A1 | * | 11/2003 | Wallner et al. ........... 280/730.2 |
| 2003/0209891 | A1 | * | 11/2003 | Kubota et al. ............ 280/730.2 |
| 2004/0113401 | A1 | * | 6/2004 | Ryu ......................... 280/730.2 |

FOREIGN PATENT DOCUMENTS

JP          2004-74867     *    3/2004

* cited by examiner

*Primary Examiner*—Paul N. Dickson
*Assistant Examiner*—George D. Spisich
(74) *Attorney, Agent, or Firm*—Ralph E. Smith

(57) ABSTRACT

An overhead trim system for a motor vehicle has a mounting bracket coupled to an overhead area of the motor vehicle and an integrally formed trim member. The integrally formed trim member is configured to extend along a selected length of a perimeter of the overhead area and defines a hinge. The integrally formed trim member is coupled to the mounting bracket to define a cavity configured for receipt of an airbag module. The hinge in a first position is capable of retaining the airbag module within the cavity and in a second position is capable of enabling the airbag module to expand.

14 Claims, 12 Drawing Sheets

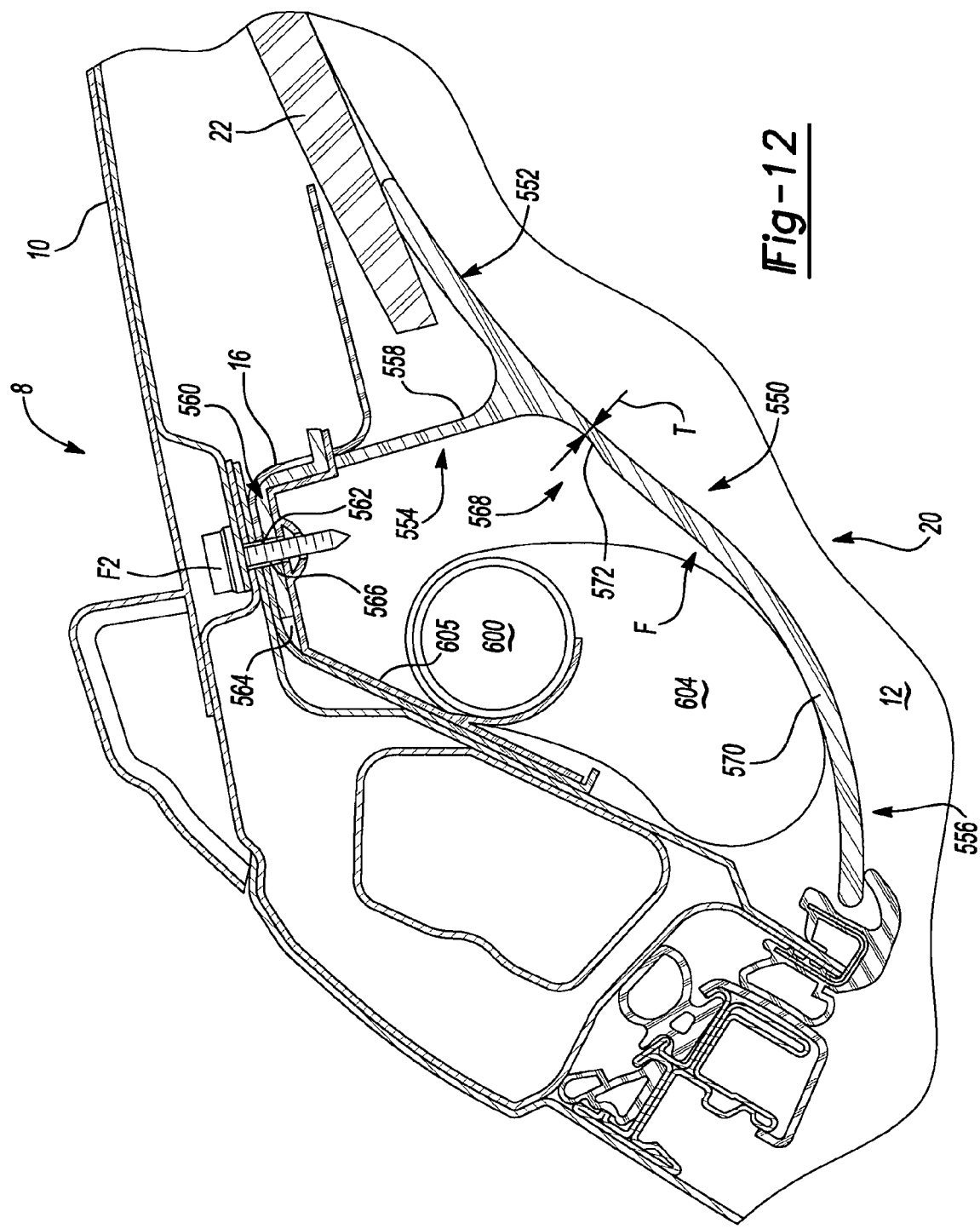

INTEGRATED OVERHEAD SIDE AIRBAG MODULE

FIELD OF THE INVENTION

The present invention relates generally to vehicle safety systems, and more particularly to a side airbag module.

BACKGROUND OF THE INVENTION

Many motor vehicles employ airbag systems as a form of passenger restraint. Typically, airbags serve to absorb the kinetic energy of a passenger generated during a crash incident by inflating into a surface operable to contact the passenger to absorb the passenger's kinetic energy. Generally, airbag systems are positioned in various locations throughout the vehicle, such as the dashboard, steering wheel, sidewall of the passenger seat and the headliner. These airbag systems require numerous mounting structures, which increase assembly time and cost of the airbag system.

SUMMARY OF THE INVENTION

The present invention provides an overhead trim system for a motor vehicle. The overhead trim system has a mounting bracket coupled to an overhead area of the motor vehicle and an integrally formed trim member. The integrally formed trim member is configured to extend along a selected length of a perimeter of the overhead area and defines a hinge. The integrally formed trim member is coupled to the mounting bracket to define a cavity configured for receipt of an airbag module. The hinge in a first position is capable of retaining the airbag module within the cavity and in a second position is capable of enabling the airbag module to expand.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 12 is a cross-sectional view of a ninth embodiment of the overhead side airbag trim system of FIG. 1, taken along line C-C of FIG. 3.

DETAILED DESCRIPTION

Figure 1:
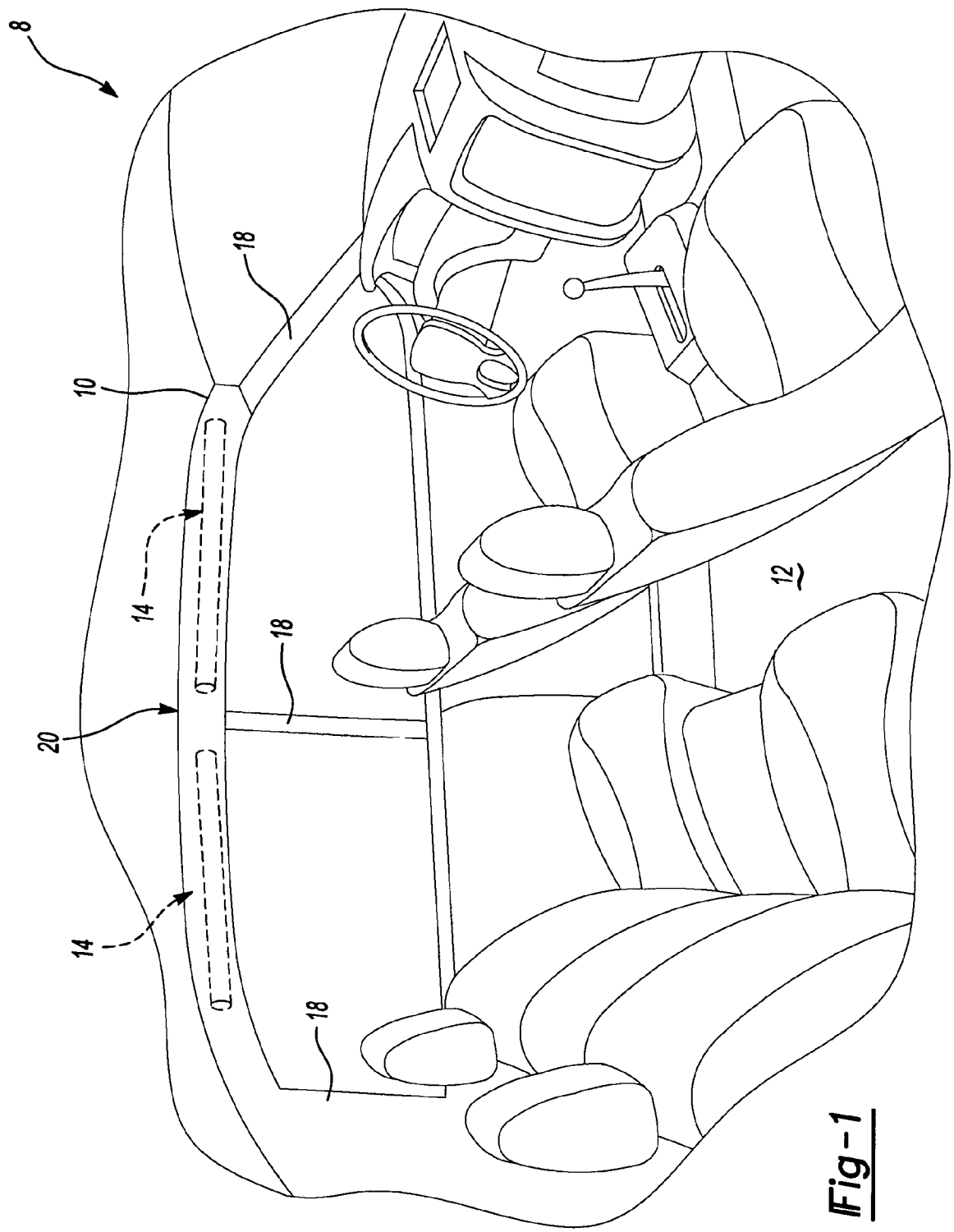
FIG. 1 is a perspective view of an exemplary motor vehicle employing an overhead side airbag module and trim system with the overhead side airbag in a first position according to the present invention.

The following description is merely exemplary in nature and is not intended to limit the present disclosure, application, or uses. It should be understood that throughout the drawings, corresponding reference numerals indicate like or corresponding parts and features.

The present invention is generally related to an overhead side airbag module for use with a safety system disposed in a motor vehicle. Although the following exemplary description refers to the use of a side airbag module disposed in a headliner of a motor vehicle, it will be understood that the present invention may be applicable to other types of airbag safety systems, and to different locations within the vehicle. Further, the foregoing description is understood to not limit the appended claims.

Figure 2:
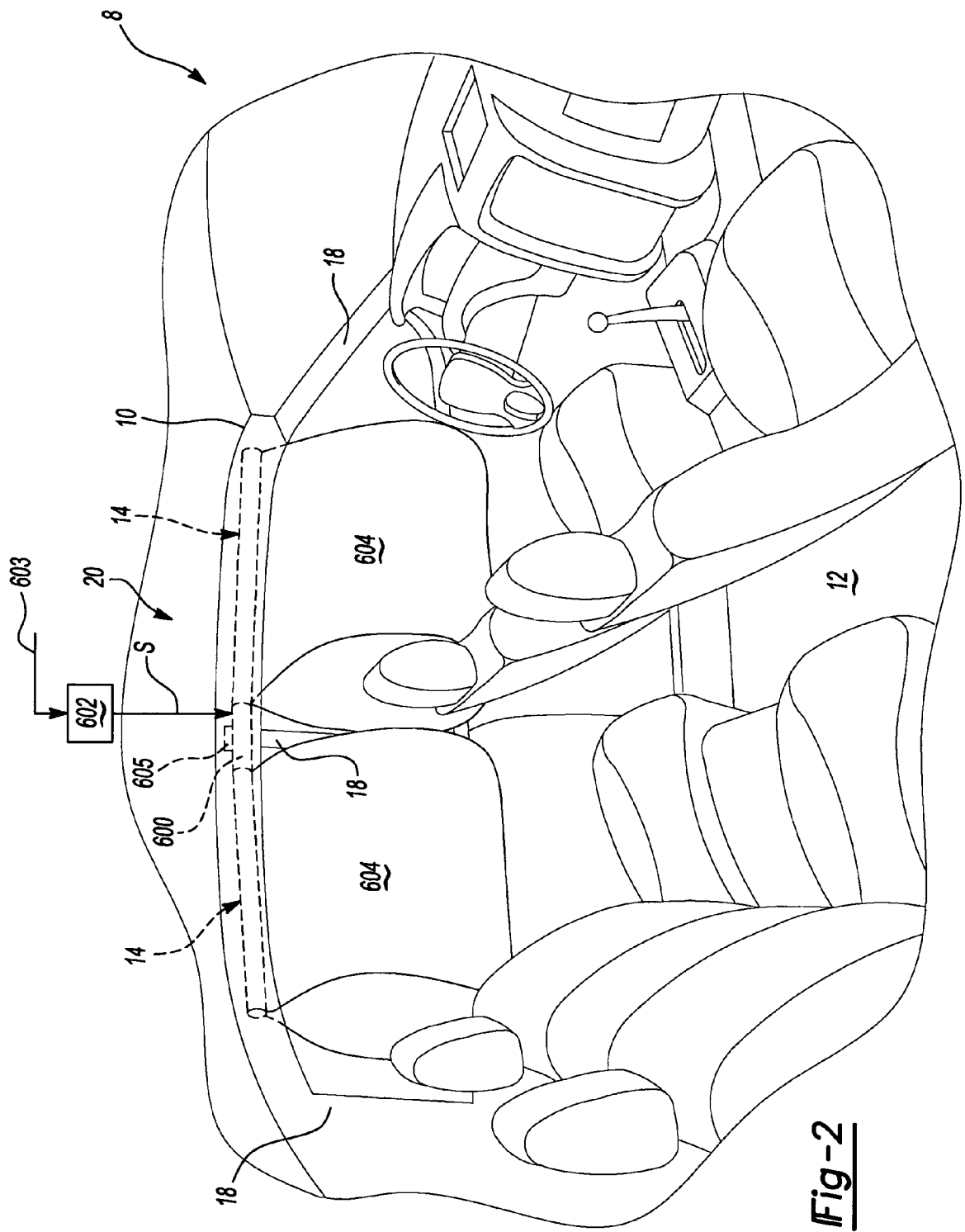
FIG. 2 is a perspective view of an exemplary motor vehicle employing the overhead side airbag module and trim system with the overhead side airbag module in a second position according to the present invention.
Figure 3:
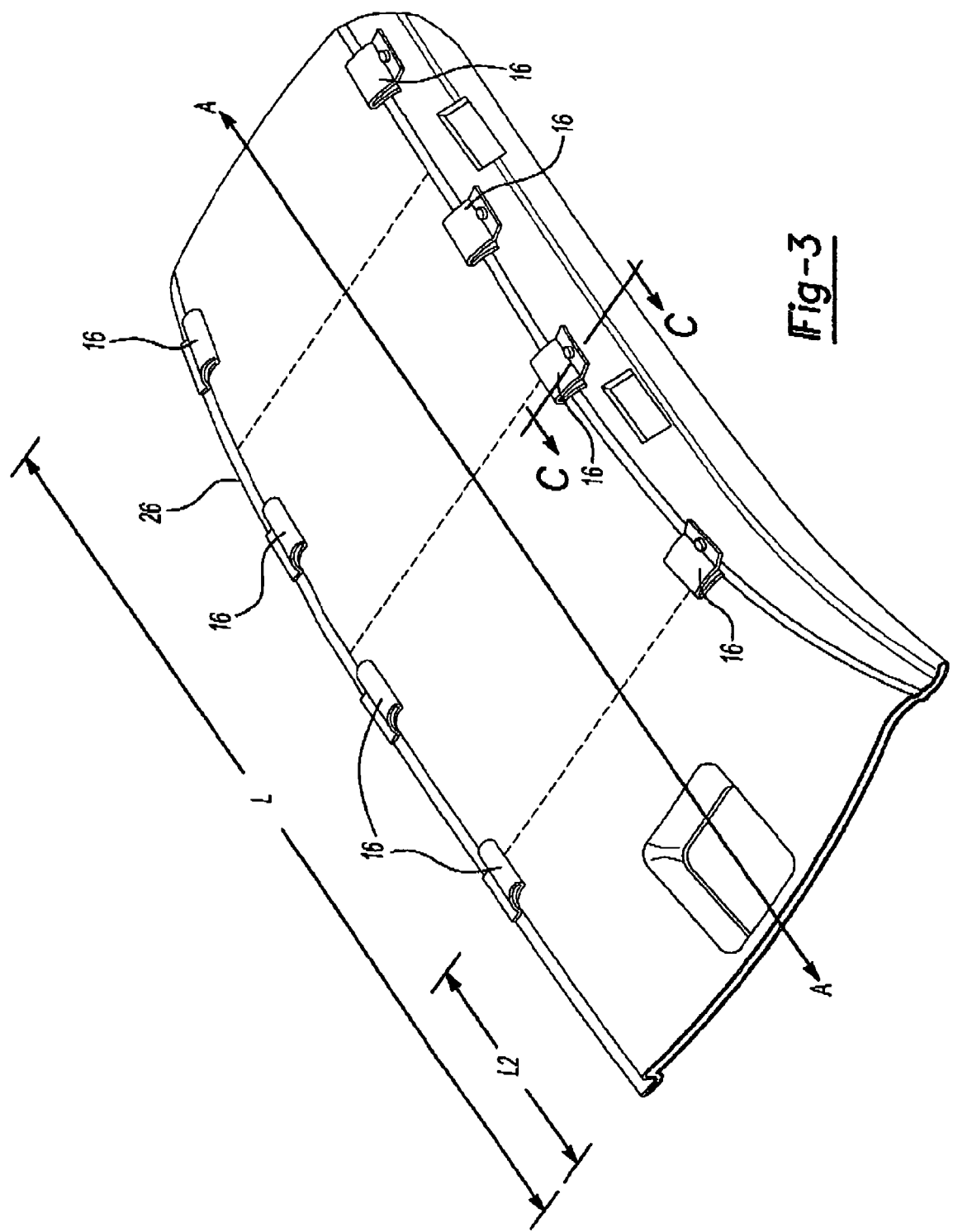
FIG. 3 is a detailed perspective view of the overhead portion of a vehicle frame showing a plurality of mounting brackets associated with the airbag module trim system of FIG. 1.

With reference now to FIGS. 1 and 2, a motor vehicle 8 is shown that includes a frame 10 defining a passenger area 12 and an overhead side airbag system 14 coupled to the frame 10. The overhead side airbag system 14 includes at least one or a plurality of mounting brackets 16 coupled to at least one or a plurality of pillars 18 on the frame 10, as shown in FIG. 3 (not specifically shown coupled). The mounting brackets 16 are coupled to the frame 10 via welding, riveting or mechanical fasteners. The motor vehicle 8 below will be described as including at least three pillars 18; however, it will be understood that any number of pillars 18 could be employed depending upon the size of the motor vehicle 8.

Figure 4:
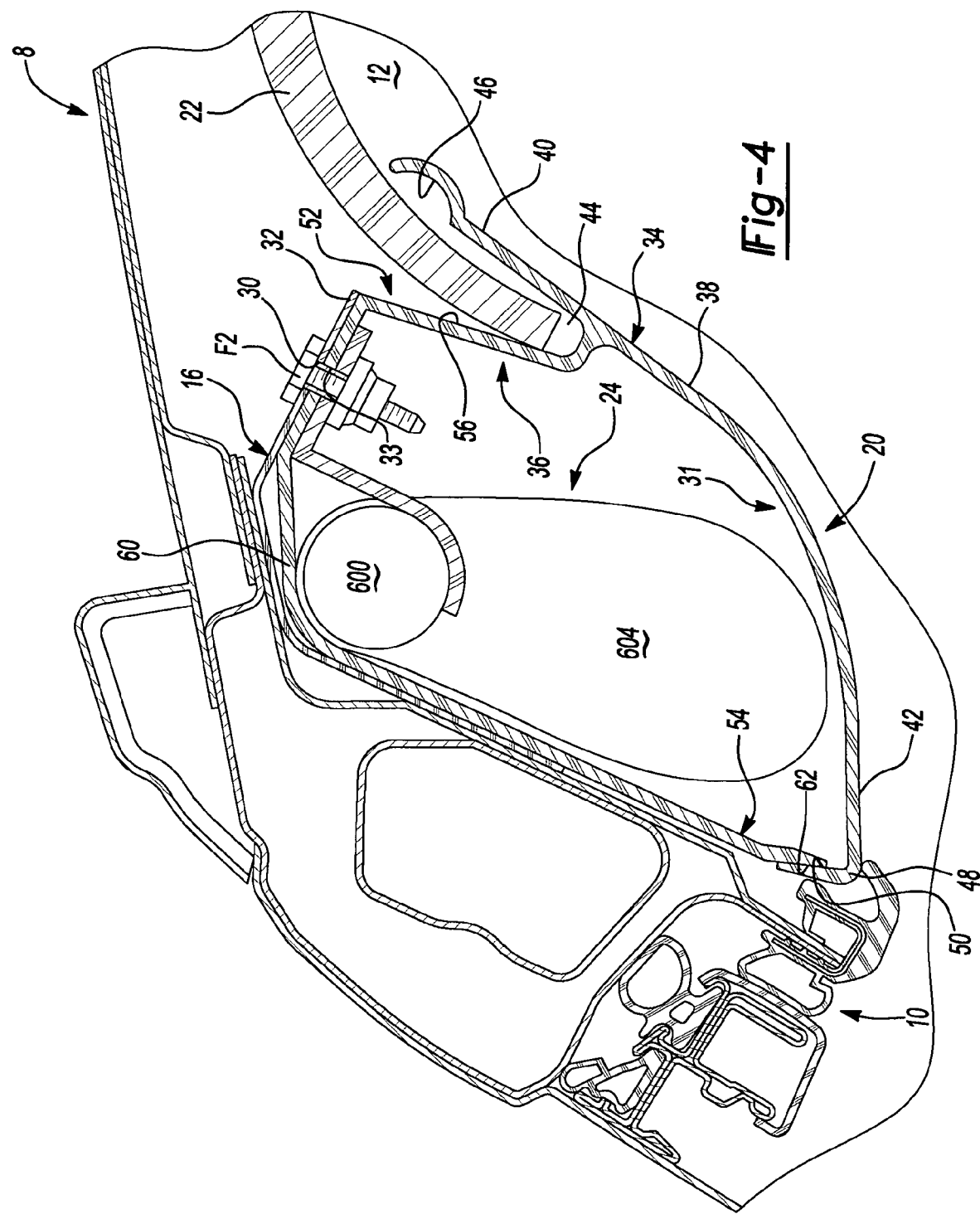
FIG. 4 is a cross-sectional view of a first embodiment of the overhead side airbag module trim system of FIG. 1, taken along line C-C of FIG. 3.

The overhead side airbag system 14 is generally symmetric about an axis A; however, it will be understood that the overhead side airbag system 14 could be asymmetrical depending upon the design of the motor vehicle 8 (FIG. 3). Generally, the overhead side airbag system 14 also includes an integral trim system 20, which is configured to be secured to the mounting brackets 16 and a headliner 22. The overhead side airbag system 14 further includes an airbag module 24 (FIG. 4). The integral trim system 20 extends an entire length L of a first side 26 of an overhead area defined by the frame 10 of the motor vehicle 8, as shown in FIG. 3, or the integral trim system 20 extends for only a selected length L2 of the overhead area to mate with additional integral trim systems 20, as shown in phantom in FIG. 3. The integrated trim system 20 also includes a variety of formed features, such as head impact countermeasures, side airbag ramps, air ducts, hooks for wiring, mounting features for handles or a center console, among others, as will be described in greater detail below (not all shown).

Various configurations of integral trim systems 20 are employed, along with various configurations of the headliner 22. As many of the configurations involve the same or similar elements, the same reference numerals will be used to denote the same or similar elements. With reference now to FIG. 4, in one embodiment, the mounting bracket 16 includes an aperture 30 defined in a first end 32 for receipt of a fastener F2 to couple the integral trim system 20 to the mounting bracket 16. It will be noted, however, that the integral trim system 20 could be coupled to mounting bracket 16 through any other technique, such as welding. The integral trim system 20 includes a member 31. The member 31 also includes an aperture 33 for receipt of the fastener F2 to couple the integral trim system 20 to the frame 10.

The member 31 includes a first arm 34 coupled to a second arm 36. The member 31 is composed of any appropriate polymeric material, such as Polypropylene (PP), Acrylonitrile Butadiene Styrene (ABS) or Thermoplastic Elastomer Polyolefin (TPO). In this one of various embodiments, the member 31 is injection-molded. Generally, the first arm 34 interfaces with the passenger area 12, so a surface 38 of the first arm 34 is treated to match or conform to the passenger area 12. The first arm 34 includes a first end 40 and a second end 42. The first end 40 of the first arm 34 extends beyond the second arm 36 to define a cavity 44 for receipt of the headliner 22. The first end 40 of the first arm 34 also includes a molded trim feature 46, which further retains the headliner 22.

The second end 42 of the first arm 34 includes a projection 48, which has a tapered surface 50 to mate with the second arm 36 in a closed position. The second arm 36 includes a first end 52 coupled to the first arm 34 and a second end 54 coupled to the first arm 34 in the closed position. The first end 52 defines an angular portion 56 to define the cavity 44 for receipt of the headliner 22. The first end 52 also defines the aperture 33 for receipt of the fastener F2 to couple the integral trim system 20 via the second arm 36 to the frame 10. A curved region 60 is adjacent to the aperture 33 on the first end 52 to define a locator for the airbag module 24, as will be discussed in greater detail herein. The second end 54 of the second arm 36 defines a tapered surface 62, which is configured to mate with the tapered surface 50 of the second arm 36 in the closed position.

In the open position, the first arm 34 extends into the passenger area 12 so that the airbag module 24 is inserted into the integral trim system 20. In the closed position, the tapered surface 50 of the first arm 34 is moved into engagement with the tapered surface 62 of the second arm 36 to couple the first arm 34 to the second arm 36 and enclose the airbag module 24, as will be discussed further herein.

Figure 5:
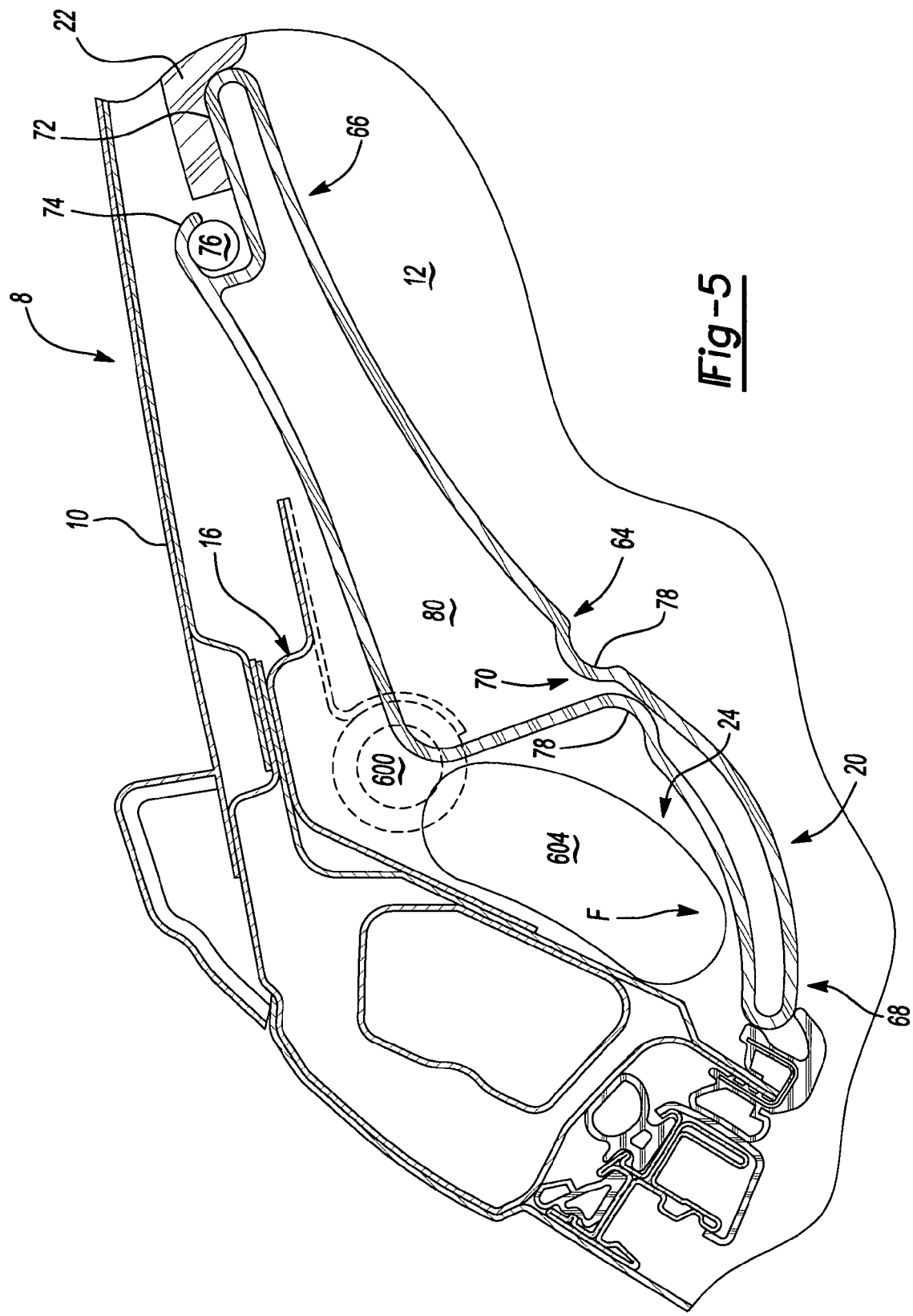
FIG. 5 is a cross-sectional view of a second embodiment of the overhead side airbag trim system of FIG. 1, taken along line C-C of FIG. 3.

In the alternative, with reference now to FIG. 5, the integral trim system 20 includes a member 64 defining a first end 66 and a second end 68 coupled to a hinge 70. The first end 66 includes a shelf 72 for receipt of at least a portion of the headliner 22. The first end 66 also includes at least one formed hook 74 for receipt of at least a portion of a wiring harness or a wire 76. The second end 68 is movable between an open position and a closed position by the hinge 70 to enable the airbag module 24 to expand, as will be discussed in greater detail herein. The hinge 70 includes a pair of curved notches 78 to enable the second end 68 to move from the closed position to the open position upon receipt of a force F from the airbag module 24. An air duct 80 is also defined within the first end 66 of the member 64 to enable airflow into the passenger area 12. In order to assemble the integral trim system 20, the entire member 64 is snapped in place or attached through other mechanical fasteners, such as screws (not specifically shown), but sonic welding could also be used.

Figure 6:
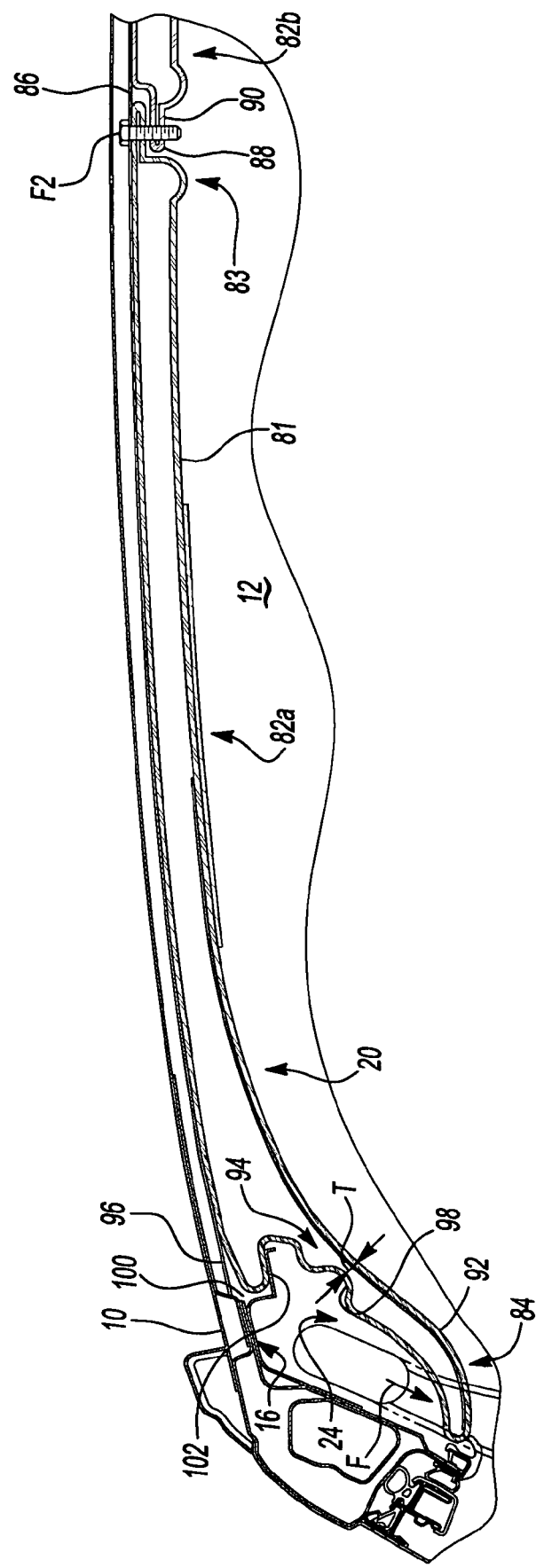
FIG. 6 is a cross-sectional view of a third embodiment of the overhead side airbag trim system of FIG. 1, taken along line C-C of FIG. 3.

With reference now to FIG. 6, integral trim system 20 is shown to include a member 82. The integral trim system 20 is formed by blow-molding a selected polymeric material, such as PP, ABS or TPO. By using blow-molding to form the integral trim system 20, a material or grain 81 is added in the molding of the member 82a to create the headliner. Thus, blow-molding the member 82a eliminates the need for a separate headliner. The member 82a forms a uniform headliner 22, or multiple members 82a are used to form a multi-piece headliner. For example, a first member 82a includes a first end 83 and a second end 84. The first end 83 defines a coupler 86 to enable a second member 82b to be secured to the first member 82a. The use of the first and second members 82a, 82b enables the assembly operator to easily assemble the first and second members 82a, 82b to the motor vehicle 8 without the removal of a windshield, for example (not specifically shown). In addition, if a portion of the integral trim system 20 or integrally formed headliner 22' becomes damaged, then that portion is replaced without replacing the entire headliner 22.

The coupler 86 generally defines an aperture 88 for receipt of a fastener F2 to couple the first member 82a to the second member 82b. It will be noted that although the coupler 86 of the first member 82a is shown to be a mirror image of a coupler 90 of the second member 82b, the couplers 86, 90 could be configured in any desired manner. The second end 84 includes a hinged portion 92 coupled to a hinge 94 and a mating protrusion 96. The hinge 94 includes at least one curved recess 98. The curved recess 98 creates an area with a reduced thickness T. The reduced thickness T enables the hinge 94 to flex upon receipt of the force F from the airbag module 24. The flexing of the hinge 94 enables the hinged portion 92 to move from a closed position to an open position into the passenger area 12 upon receipt of the force F from the airbag module 24. The mating protrusion 96 generally is sized to engage a cavity 100 formed by an arm 102 of the mounting bracket 16 and the frame 10.

In order to assemble the integral trim system 20 to the frame 10 of the motor vehicle 8, the first member 82a is coupled to a first side of the frame 10, and the mating protrusion 96 is coupled to the cavity 100. Then, the mating protrusion 96 of the second member 82b is coupled to a second side 104 of the frame 10. Next, the coupler 86 is secured to the coupler 90 via at least one fastener F2.

Figure 7:
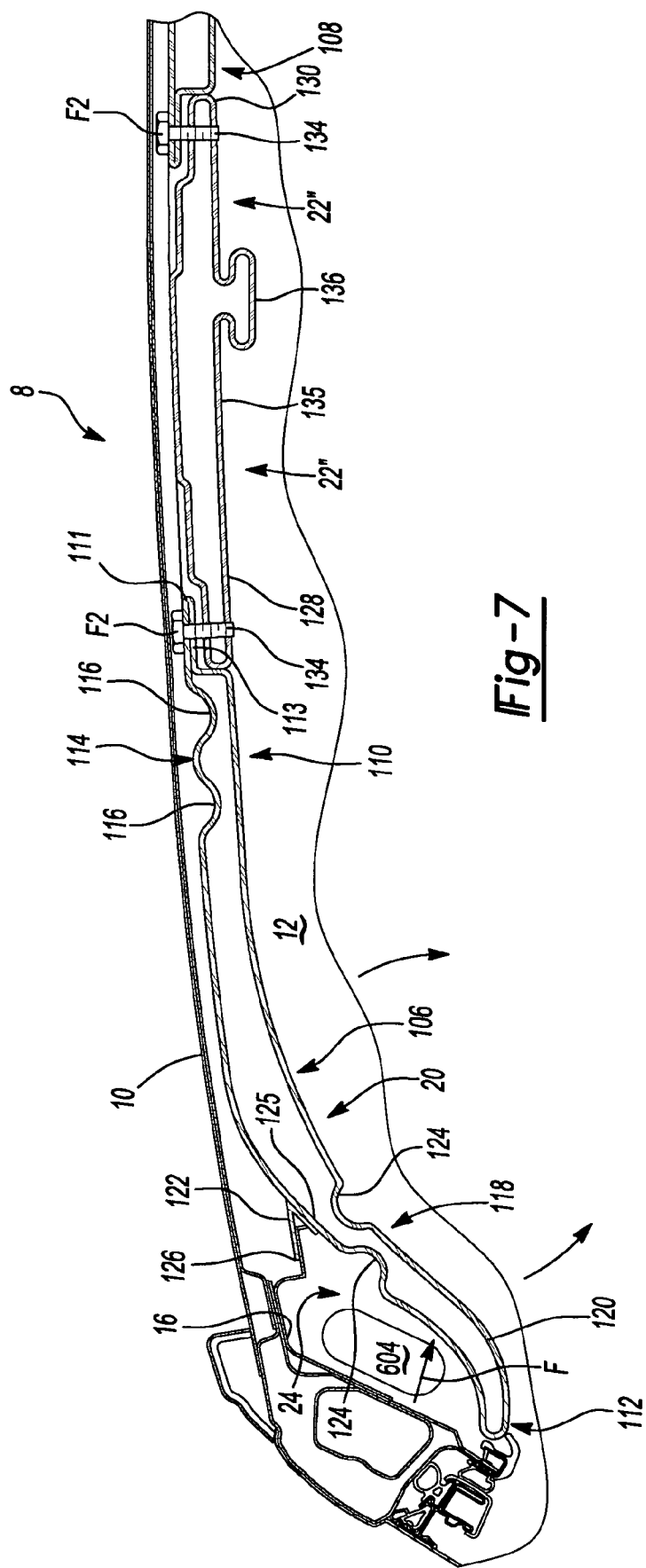
FIG. 7 is a cross-sectional view of a fourth embodiment of the overhead side airbag trim system of FIG. 1, taken along line C-C of FIG. 3.

In the alternative, with reference to FIG. 7, an integral trim system 20 is shown coupled to a molded headliner 22". The integral trim system 20 is composed of a first integral trim member 106 and a second integral trim member 108. As the first integral trim member 106 is substantially similar to the second integral trim member 108, only the first integral trim member 106 will be discussed herein. The first integral trim member 106 includes a first end 110 and a second end 112. The first integral trim member 106 is formed by blow-molding and, thus, is composed of any suitable polymeric material, such as PP, TPO or ABS. The first end 110 of the first integral trim member 106 includes a first hinge 114. The first hinge 114 is defined by at least one curved groove 116. The first hinge 114 provides additional room for the airbag module 24 to expand, as will be discussed in greater detail herein. The first end 110 also includes a coupler 111 to couple the first integral trim member 106 to the headliner 22". The coupler 111 defines an aperture 113 for receipt of a fastener F2 therein. The second end 112 of the first integral trim member 106 defines a second hinge 118, a hinged portion 120 and an attachment 122.

The second hinge 118 is defined by at least one or two curved grooves 124 formed in the second end 112. The curved grooves 124 enable the hinged portion 120 to move from a closed position to an open position upon receipt of the force F from the airbag module 24. The attachment 122 includes a first end 125 coupled adjacent to the second hinge 118. The attachment 122 enables the first hinge 114 to extend for a pre-selected distance into the passenger area 12 upon receipt of the force F from the airbag module 24. The attachment 122 could be composed of any suitable retaining device, such as a tether; however, other suitable devices could be employed. A second end 126 of the attachment 122 is coupled to the mounting bracket 16.

The headliner 22" includes a first end 128 and a second end 130. The first end 128 is adapted to be coupled to the first end 110 of the first integral trim member 106, and the second end 130 is configured to be coupled to a first end 132 of the second integral trim member 108. Thus, the first end 128 and second end 130 each defines an aperture 134 for receipt of the fastener F2 therein to couple the headliner 22" to the integral trim system 20. The headliner 22" is blow-molded and composed of any suitable polymer, such as PP, TPO or ABS, and thus a material or grain 135 is added in the mold to create an integral headliner 22" that does not require post-processing steps. Additionally, the headliner 22" is molded to include a center console 136. The center console 136 is molded to include various compartments for electronics or storage as desired (not specifically shown).

In order to assemble the integral trim system 20 to the frame 10, first the mounting bracket 16 and the airbag module 24 are coupled to the frame 10. Next, the attachment 122 of the first integral trim member 106 and the second integral trim member 108 is each coupled to the mounting bracket 16. Next, the first end 128 of the headliner 22" is coupled to the coupler 111 of each of the first integral trim member 106 and second integral trim member 108 via the fastener F2.

Figure 8:
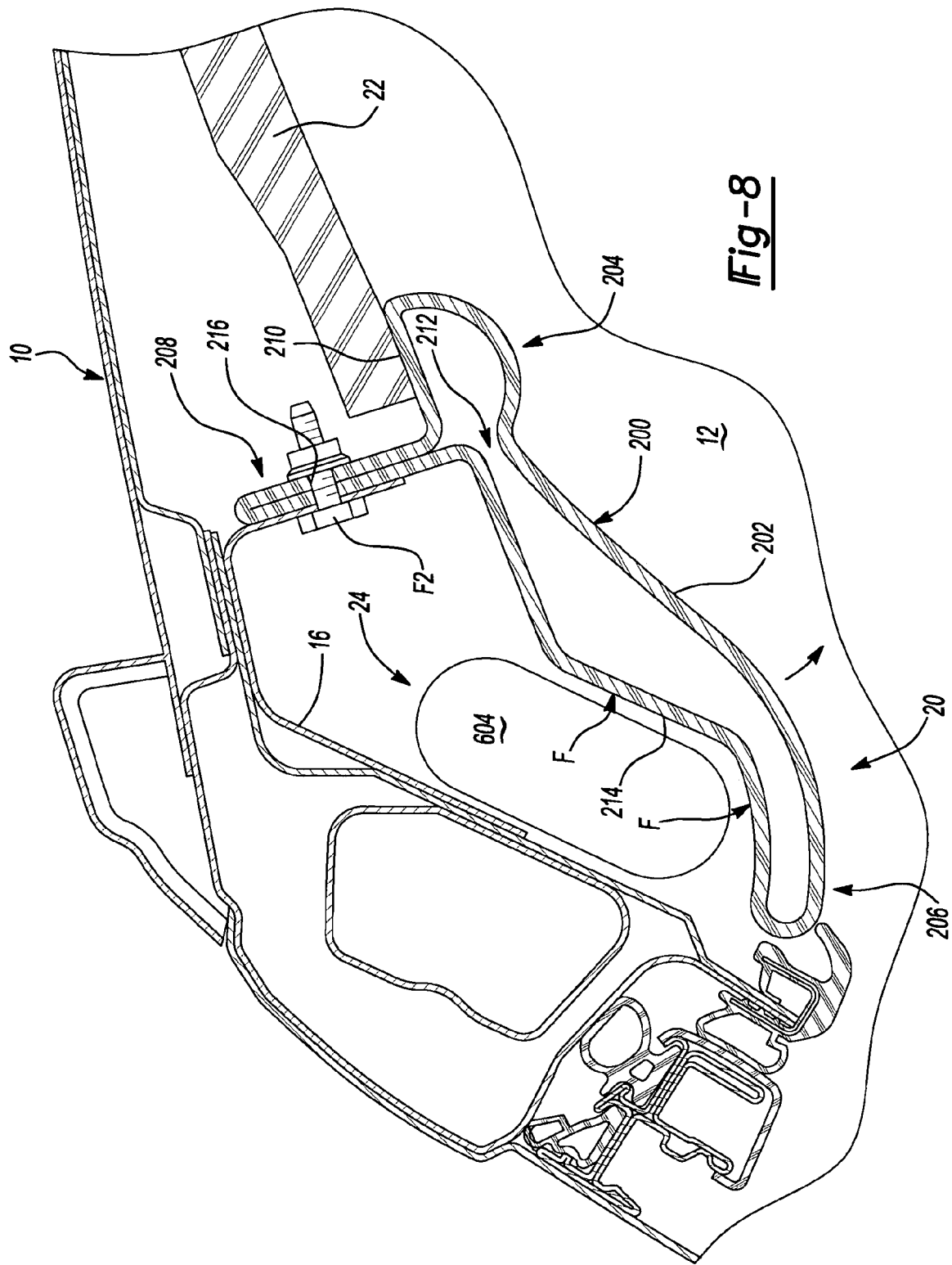
FIG. 8 is a cross-sectional view of a fifth embodiment of the overhead side airbag trim system of FIG. 1, taken along line C-C of FIG. 3.

With reference now to FIG. 8, integral trim system 20 is shown. The integral trim system 20 includes a member 200. The member 200 is blow-molded to include a grain or material 202 to reduce the need for a post-processing step prior to installation of the member 200 to the passenger area 12 of the motor vehicle 8. The member 200 defines a first end 204, a second end 206 and a mating arm 208. The first end 200 includes a surface 210 for receipt of the headliner 22. A hinge 212 is defined between the first end 204 and the second end 206 to enable the second end 206 to move from a closed position to an open position upon receipt of the force F from the airbag module 24. The second end 206 also defines angular retainer 214, which is used to confine a portion of the airbag module 24. The mating arm 208 is formed adjacent to the hinge 212 and generally extends away from the passenger area 12. The mating arm 208 further defines an aperture 216 for receipt of a fastener F2 therein to couple the integral trim system 20 to the mounting bracket 16.

In order to assemble the integral trim system 20 to the frame 10, the mounting bracket 16 and the airbag module 24 are coupled to the frame 10. Then, the mating arm 208 of the member 200 is coupled to the mounting bracket 16 via the fastener F2. The headliner 22 is then inserted into the passenger area 12 so that the headliner 22 contacts the surface 210 of the first end 204 to couple the headliner 22 to the member 200.

Figure 9:
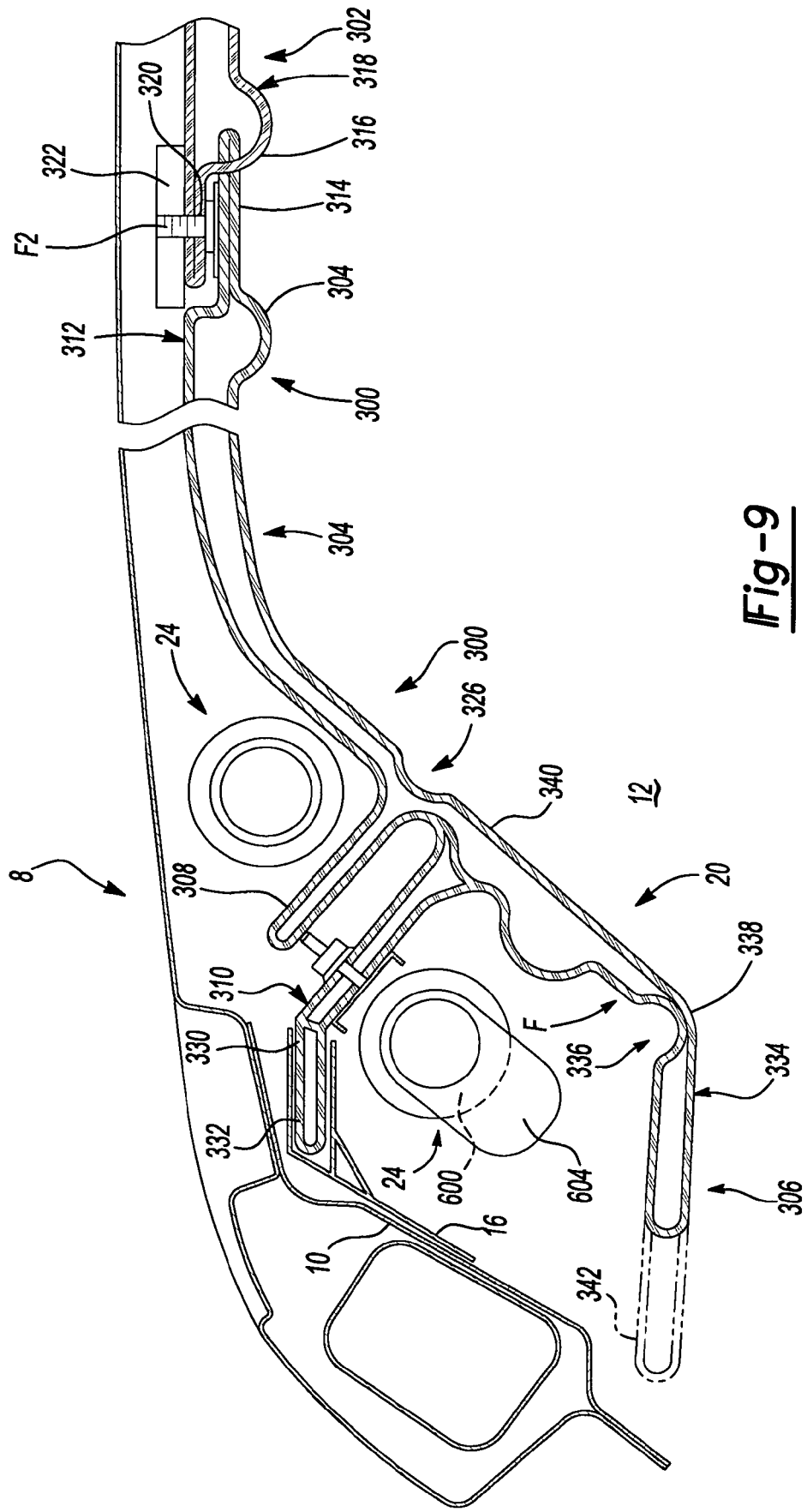
FIG. 9 is a cross-sectional view of a sixth embodiment of the overhead side airbag trim system of FIG. 1, taken along line C-C of FIG. 3.

Alternatively, with reference now to FIG. 9, the integral trim system 20 includes at least a first member 300 and a second member 302, which form a headliner. Thus, integral trim system 20 eliminates the need for an external headliner 22. The integral trim system 20 is formed through blow-molding and is composed of PP, TPO or ABS. As the first member 300 is substantially similar to the second member 302, only the first member 300 is discussed herein. The first member 300 includes a first end 304, a second end 306, a first arm 308 and a second arm 310. The first end 304 includes a coupler 312. The coupler 312 includes a hook 314 adapted to mate with a notch 316 formed on a coupler 318 of the second member 302. The coupler 318 of the second member 302 also defines an aperture 320 to secure the integral trim system 20 to the frame 10. A mounting bracket 322 is coupled to the frame 10, which also defines a mating aperture 324. The mating aperture 324 and aperture 320 formed in the coupler 318 are configured to receive a fastener F2 to couple the integral trim system 20 to the frame 10. It will be understood, however, that any appropriate mechanism or technique could be used to couple the integral trim system 20 to the frame 10, and the couplers 312, 318 have any desired configuration.

The first arm 308 is disposed adjacent to the first end 304. The first arm 308 serves as a locator for the airbag module 24, and defines apertures (not shown) to couple the airbag module 24 to the integral trim system 20 (not specifically shown). A first hinge 326 also is formed at an end 328 of the first arm 308 to enable the second end 306 of the first member 300 to move from a closed position to an open position upon the receipt of the force F from the airbag module 24.

The second arm 310 is formed adjacent to the first arm 308 and the second end 306. The second arm 310 includes a branch 330 extending therefrom to engage a cavity 332 formed in the mounting bracket 16. The branch 330 and the cavity 332 enable the integral trim system 20 to be coupled to the frame 10 without the use of mechanical fasteners, and enable blind attachment of the integral trim system 20 to the mounting bracket 16.

The second end 306 of the first member 300 includes a hinged portion 334 coupled to a hinge 336. The hinge 336 is defined by a groove 338. The groove 338 creates an area with a reduced thickness T so that upon receipt of the force F from the airbag module 24, the hinged portion 334 moves from a closed position to an open position, as will be described in greater detail herein. The hinged portion 334 includes a first end 340 coupled to the hinge 336 and a second end 342 releasably coupled to the frame 10 (not specifically shown).

In order to assemble the integral trim system 20 to the frame 10, the mounting bracket 16 is coupled to the frame 10. Then, the airbag module 24 is coupled to the frame 10. Next, the first and second members 300, 302 are positioned into the passenger area 12 so that the branch 330 of the second arm 310 engages the cavity 332. The fastener F2 is then inserted through the aperture 320 to couple the second member 302 to the frame 10. Then, the hook 314 of the coupler 312 engages the notch 316 of the coupler 318 to secure the first member 300 to the second member 302.

Figure 10:
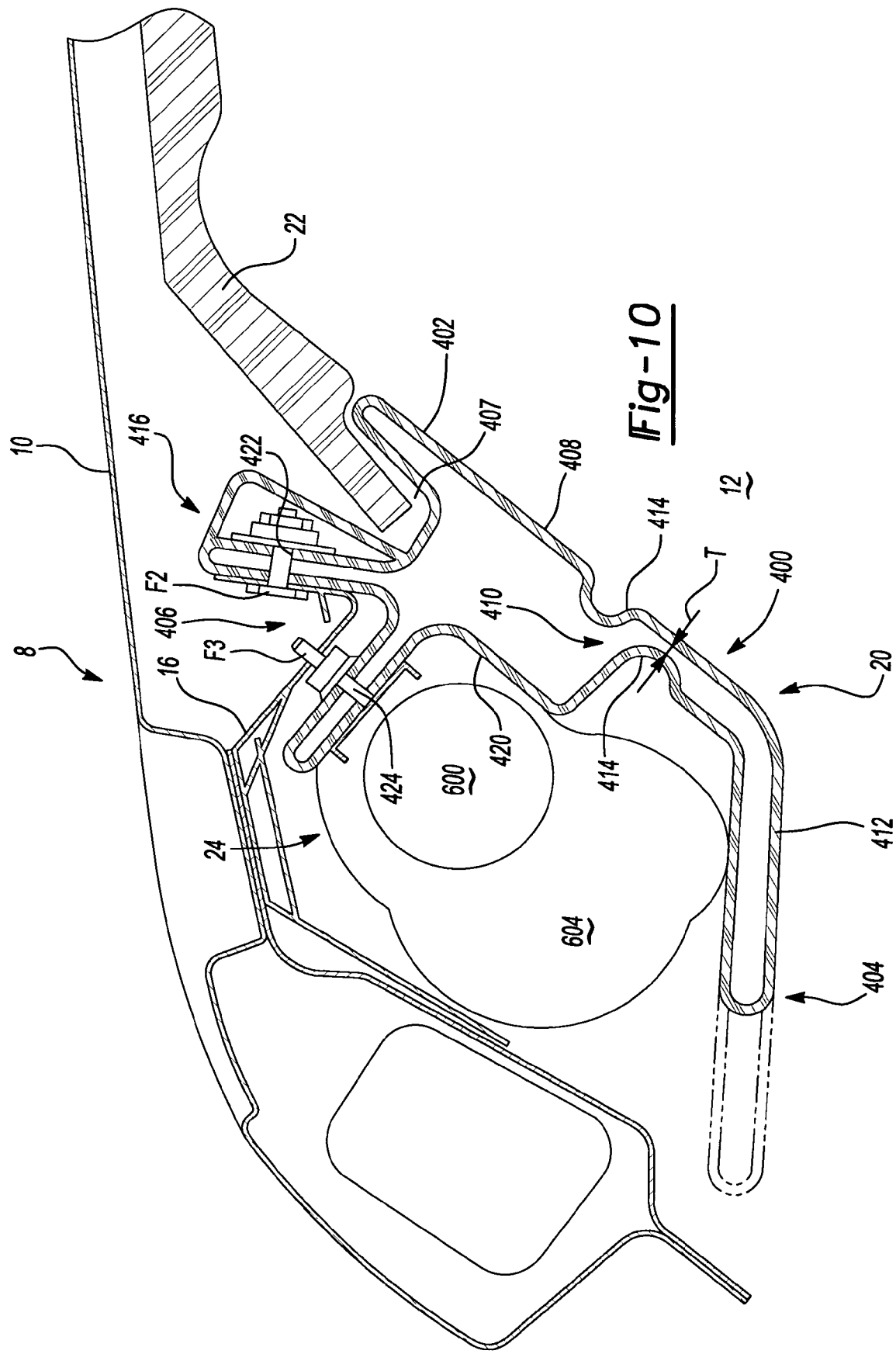
FIG. 10 is a cross-sectional view of a seventh embodiment of the overhead side airbag trim system of FIG. 1, taken along line C-C of FIG. 3.

Alternatively, the integral trim system 20 includes a member 400 defining a first end 402, a second end 404 and a retaining portion 406, as shown in FIG. 10. The member 400 is blow-molded and is composed of PP, TPO or ABS, for example. The member 400 includes a material or grain 408 to enable the member 400 to match the headliner 22 without the need for a post-processing step. The first end 402 defines a cavity 407 for receipt of the headliner 22. The second end 404 defines a hinge 410 and a hinged portion 412. The hinge 410 is formed by at least one or a plurality of grooves 414. The grooves 414 create at least one area with a reduced thickness T, which deflect the hinged portion 412 into the passenger area 12 upon the receipt of the force F from the airbag module

24, as will be discussed in detail herein. The retaining portion 406 is disposed adjacent to the hinge 410 and includes a first arm 416, a second arm 418, and a shelf 420. The first arm 416 defines an aperture 422 for receipt of a fastener F2 to couple the member 400 to the mounting bracket 16. The second arm 418 defines an aperture 424 for receipt of a fastener F3 to couple at least a portion of the airbag module 24 to the member 400. The shelf 420 assists in distributing the force F from the airbag module 24 to the hinge 410.

In order to assemble the integral trim system 20 to the frame 10, the mounting bracket 16 is coupled to the frame 10. At least a portion of the airbag module 24 is then coupled to the second arm 418. Then, the first arm 416 is coupled to the mounting bracket 16 via the fastener F2. The headliner 22 is then inserted into the passenger area 12 so that the headliner 22 is received in the cavity 407.

Figure 11:
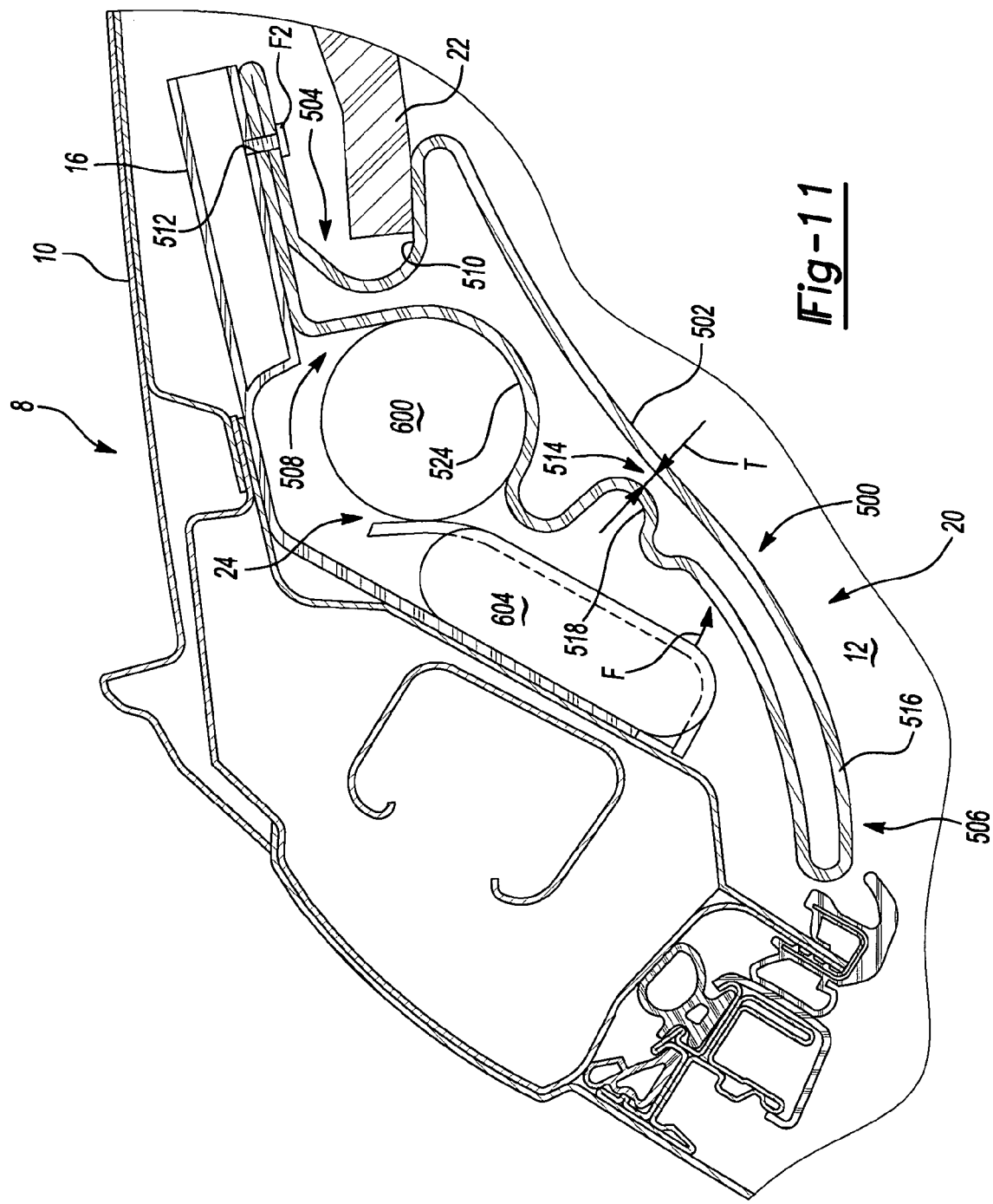
FIG. 11 is a cross-sectional view of an eighth embodiment of the overhead side airbag trim system of FIG. 1, taken along line C-C of FIG. 3.

With reference now to FIG. 11, an alternative integral trim system 20 is shown. The integral trim system 20 includes a member 500. The member 500 is blow-molded and is composed of PP, TPO or ABS. As the member 500 is blow-molded, the member 500 includes a material or grain 502 to enable the member 500 to conform to the passenger area 12 without requiring a post-processing step. The member 500 includes a first end 504, a second end 506 and a locator 508. The first end 504 defines a cavity 510 for receipt of the headliner 22. The first end 504 also defines at least one aperture 512 for receipt of a fastener F2 to couple the integral trim system 20 to the mounting bracket 16.

The second end 506 includes a hinge 514 and a hinged portion 516. The hinge 514 is formed by a groove 518, which creates an area with a reduced thickness T so that upon receipt of the force F from the airbag module 24, the hinge 514 causes the hinged portion 516 to move from a closed position to an open position. The locator 508 is formed between the first end 504 and the second end 506. The locator 508 defines an arcuate surface 524 slideably coupled to at least a portion of the airbag module 24, such as an inflator 600, to aid in ensuring the proper placement of the integral trim system 20 prior to coupling the member 500 to the frame 10.

In order to couple the integral trim system 20 to the frame 10, the mounting bracket 16 is first coupled to the frame 10. The member 500 is then aligned so that the arcuate surface 524 of the locator 508 is adjacent to the inflator 600. Next, the fastener F2 is inserted through the aperture 512 to couple the integral trim system 20 to the mounting bracket 16. Then, the headliner 22 is inserted into the passenger area 12 so that the headliner 22 is coupled to the cavity 510 formed in the first end 504 of the member 500.

With reference now to FIG. 12, an integral trim system 20 is shown to include a member 550. The member 550 is composed of any appropriate polymeric material, such as PP, ABS or TPO. The member 550 is injection-molded and is treated to match or conform to the passenger area 12. The member 550 includes a first end 552, an arm 554 and a second end 556. The first end 552 and the mounting bracket 16 define a cavity 558 for receipt of the headliner 22. The arm 554 includes a branch 560 that defines an aperture 562 for receipt of a fastener F2. The branch 560 is configured to mate with a cavity 564 formed in the mounting bracket 16. The mounting bracket 16 also includes an aperture 566 for receipt of the fastener F2 to couple the mounting bracket 16 and the member 550 to the frame 10. It will be noted, however, that the mounting bracket 16 could be coupled to the frame 10 through any other technique, such as welding.

The second end 556 defines a hinge 568 coupled to a hinged portion 570. The hinge 568 is formed by a groove 572 that creates a reduced thickness T to enable the hinged portion 570 to enter the passenger area 12 upon receipt of the force F from the airbag module 24.

In order to couple the integral trim system 20 to the frame 10, the airbag module 24 is first coupled to the mounting bracket 16. Next, the member 550 is coupled to the frame 10. Generally, the branch 560 of the arm 554 is inserted into the cavity 564 of the mounting bracket 16 and then the fastener F2 is inserted into the aperture 562 of the arm 554 and the aperture 566 of the mounting bracket 16 to couple the member 550 and mounting bracket 16 to the frame 10.

With reference back to FIGS. 2-12, the airbag module 24 includes an inflator 600 responsive to a controller 602 and an airbag 604 responsive to the inflator 600 (FIG. 2). Generally, the airbag module 24 includes a mounting bracket 605, which is couple to the mounting bracket 16. The controller 602 is operable to provide a signal S to ignite the inflator 600 upon receipt of an input 603 indicating a crash event (FIG. 2). The inflator 600, based on the signal S, causes a chemical reaction to generate a gas to inflate the airbag 604 to expand the airbag 604 from a first position (FIG. 1) to a second position (FIG. 2). The airbag 604 is generally configured to expand momentarily prior to contacting the integral trim system 20. The contact between the expanding airbag 604 and the integral trim system 20 provides the force F necessary to move the first arm 34, second end 68, 206, 306 or hinged portion 96, 120, 412 from the closed position to the open position. The airbag 604 is generally sized to extend for a substantial distance into the passenger area 12 (FIG. 2).

The description of these teachings is merely exemplary in nature and, thus, variations that do not depart from the gist of the teachings are intended to be within the scope of the teachings. Such variations are not to be regarded as a departure from the spirit and scope of the teachings.

What is claimed is:

1. An overhead trim system for a motor vehicle, the motor vehicle including an overhead area and a passenger compartment, the overhead trim system comprising:
   a first mounting bracket formed to have a mounting portion and adapted to be coupled via the mounting portion to the overhead area of the motor vehicle; and
   an integrally formed trim member having a base potion and an arm portion extending away from the base portion, the arm portion directly coupled to and engaging the at first mounting bracket at the mounting portion and cooperating with the base portion to define a cavity capable of receiving an airbag module, the base portion of the integrally formed trim member having a length configured to extend along a selected length of a perimeter of the overhead area of the motor vehicle and defining at least one hinge;
   wherein the at least one hinge in a first position is capable of retaining an airbag module within the cavity and the at least one hinge in a second position is capable of enabling an airbag module to expand into the passenger compartment.

2. The overhead trim system of claim 1, wherein the motor vehicle further includes a frame, and the first mounting bracket is adapted to be coupled to the frame.

3. The overhead trim system of claim 1, further comprising:
   a second mounting bracket coupled to the first mounting bracket at least at the mounting portion, the second mounting bracket disposed in the cavity and adapted to be coupled to an airbag module inflator.

4. The overhead trim system of claim 1, further comprising:
a headliner coupled to the integrally formed trim member.

5. The overhead trim system of claim 4, wherein the integrally formed trim member is formed by injection-molding.

6. The overhead trim system of claim 1, wherein an end of the base portion extending beyond the arm portion cooperates with an end of the first mounting bracket to define a second cavity adapted to receive a headliner.

7. A motor vehicle comprising:
a frame defining a passenger area and an overhead area above the passenger area;
a headliner;
a first mounting bracket forming a mounting portion and coupled via the mounting portion to the frame at a first coupling location;
a first trim member having a base portion with a first end and a second end and an arm portion extending away from the base portion, the arm portion directly coupled to and engaging the mounting portion of first mounting bracket at the first coupling location such that the arm portion, the base portion and the first mounting bracket define a first cavity, the base portion of the first trim member configured to extend a selected length of the overhead area of the frame and defining at least one hinge, the first end of the base portion extending beyond the arm portion and cooperating with the first end of the mounting bracket to form a second cavity for receiving the headliner;
a second mounting bracket coupled to the first mounting bracket and the arm portion at the first coupling location, the second mounting bracket disposed in the first cavity;
a first inflator coupled to the second mounting bracket, the first inflator responsive to an input; and
a first airbag configured to be received in the first cavity, the first airbag responsive to the first inflator to expand based on the input;
wherein the at least one hinge is responsive in a first position to retain the first airbag within the cavity and the at least one hinge is responsive in a second position to enable the first airbag to expand into the passenger area upon the receipt of the input.

8. The motor vehicle of claim 7; wherein the arm portion of the first trim member includes a branch portion extending at an angle therefrom, the branch portion being coupled to the first mounting bracket and the second mounting bracket at the first coupling location.

9. The motor vehicle of claim 8, wherein the branch portion, first mounting bracket, second mounting bracket and frame each include an aperture positioned at the first coupling location and configured to receive a fastener, the fastener coupling the first and second mounting brackets and the branch portion to the frame at the first coupling location.

10. The motor vehicle of claim 7, wherein the second mounting bracket includes an integral support member extending at an angle therefrom, the first inflator being coupled to the integral support member.

11. The motor vehicle of claim 7, wherein the first trim member is formed from a polymeric material.

12. The motor vehicle of claim 7, further comprising:
a third mounting bracket coupled to the frame;
a second trim member, the second trim member coupled to the third mounting bracket to define a third cavity, the second trim member configured to extend a selected length of a perimeter of the overhead area of the frame, the second trim member defining a hinge;
a fourth mounting bracket coupled to the third mounting bracket, the fourth mounting bracket disposed in the third cavity;
a second inflator coupled to the fourth mounting bracket, the second inflator responsive to an input; and
a second airbag configured to be received in the third cavity, the second airbag responsive to the second inflator to expand based on the input,
wherein the hinge is responsive in a first position to retain the second airbag within the third cavity and the hinge is responsive in a second position to enable the second airbag to expand into the passenger area upon the receipt of the input.

13. The motor vehicle of claim 12, further comprising:
a headliner coupled to the first trim member and the second trim member.

14. The motor vehicle of claim 12, wherein the first trim member and the second trim member are formed by injection-molding.

* * * * *